Figure 1:
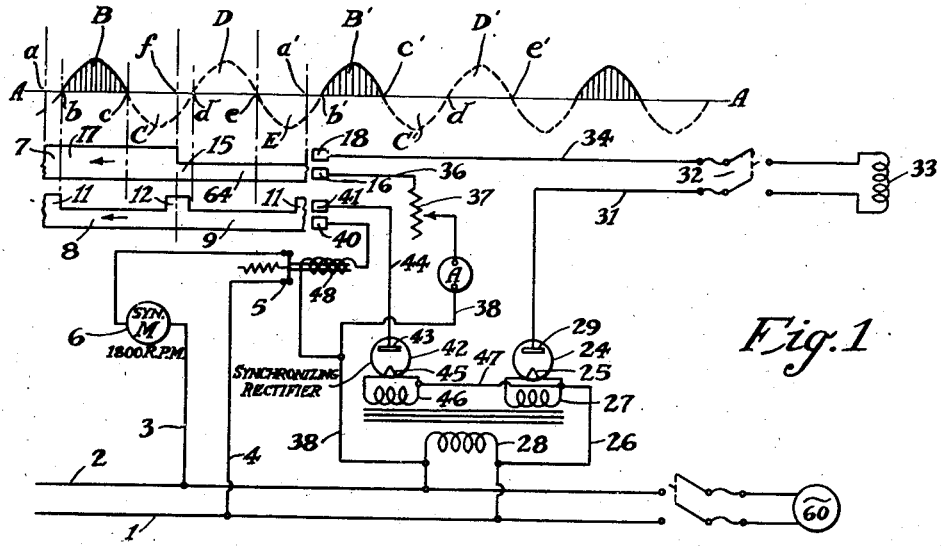

Oct. 12, 1943.   C. S. WEYANDT   2,331,820
ELECTRICALLY OPERATED VIBRATORY CONVEYER
Filed Oct. 24, 1940   2 Sheets-Sheet 1

Inventor
Carl S. Weyandt
By Lewis D. Knigsford
Attorney

Patented Oct. 12, 1943

2,331,820

UNITED STATES PATENT OFFICE 2,331,820

ELECTRICALLY OPERATED VIBRATORY CONVEYER

Carl S. Weyandt, Homer City, Pa.

Application October 24, 1940, Serial No. 362,501

2 Claims. (Cl. 172—126)

The present invention relates to electrically operated vibratory motors particularly suitable for operating vibratory conveyers, and the method of operation therefor.

It has heretofore been proposed to operate vibratory conveyers directly from an alternating current circuit by means of a vibratory electric motor, but inasmuch as the alternating currents generally available are sixty cycle or fifty cycle currents, such conveyers have had to be operated at 6000 vibrations per minute or higher. The construction of an electrically operated vibratory conveyer vibrating at such high frequencies entails practical difficulties that limit the nature and application of the conveyer. For example, the trough of the conveyer must be made extremely rigid, and this limits the minimum weight or thickness of the trough, and the requirement for rigidity also limits the length of unsupported trough that can be operated by one motor. By locating a plurality of motors or supports at spaced points along the length of the trough, it is possible to vibrate very long troughs to produce a conveying action, but the cost of multiple motors and the weight of the trough remain as serious disadvantages. Further, where structural requirements provide for an overhanging of the trough from its supports, the amount of overhang is definitely limited by the rigidity of the trough, which in turn depends on the thickness or weight of the trough and the nature of the material of which it is made.

It has been proposed to operate the conveyer motor by current impulses having substantial periods of zero current therebetween and derived by a rectifier from an alternating current circuit. However, as most alternating currents available are sixty cycle or fifty cycle, the conveyer will still have a frequency of vibration of at least 3000 vibrations per minute, which is still high enough in some instances to entail the disadvantages pointed out above. Also, because of the inductance of the circuits of this type, the zero space between current impulses is less than the duration of the actuating current impulse, and may be only one third as long.

While currents of frequencies lower than fifty or sixty cycle may be obtained by means of a motor generator set which will operate the conveyer at frequencies of vibration lower than 3000, the expense of such equipment frequently is prohibitive. Furthermore, when a conveyer trough is operated directly from an alternating current source, it is necessary that the natural period of the conveyer mounting closely approach electromechanical resonance with the electromagnetic impulses in order to obtain an appreciable amplitude of vibration, and this results in extreme sensitivity to changes in mass or load of the conveyer. However, even operation of a conveyer directly from an alternating current of lower frequencies than 3000 does not allow the conveyer trough to be made materially lighter, nor does it enable the use of long overhanging troughs.

According to the present invention I operate a vibratory motor from an alternating current source of predetermined frequency by preselected current impulses commencing at intervals 540 or more electrical degrees apart, the intermediate current impulses being suppressed. This provides a regularly recurring or periodic series of actuating current impulses separated by zero periods of greater duration than that of the current impulses. When operating a conveyer by the motor, I prefer to employ actuating impulses at the rate of 1800 per minute which may be obtained from a sixty cycle current by suppressing three adjacent current impulses and allowing each fourth impulse to operate the conveyer. However, by suppressing two adjacent current impulses and allowing each third impulse to operate the conveyer, the conveyer may be operated at 2400 vibrations per minute from a sixty cycle source.

It is my theory that the difficulties heretofore encountered in high frequency conveyers has been due to the setting up of local vibrations or anodes in the trough which produce oppositely disposed conveying forces, so that when material is placed in the trough it will be conveyed from both ends toward the middle or toward one or more dead spaces or nodes at some other intermediate point or points. The number of nodes increases with the flexibility of the trough, as the higher regular frequencies of vibration have the ability of setting up sympathetic vibrations of lower multiple frequencies. This theory explains why a more flexible trough cannot be used even at frequencies less than 3000, that is, because this regularly recurring frequency is high enough to set up sympathetic vibration nodes.

I believe that by providing a zero interval between current impulses greater than the duration of actuating current impulses, any local vibrations that arise in the conveyer trough have sufficient time to subside and become damped before the next actuating current impulse occurs, and thus any resonant nodes of vibration which may occur are not propagated. As a result, I may employ a less rigid conveyer trough than heretofore used, as the conveyer trough need only be rigid enough to support its load, and I may use long unsupported lengths or overhangs of the conveyer trough. In practice I have been able to construct conveyer troughs of "Nichrome" vibrating at 1800 vibrations per minute with an overhang of as much as seven feet, whereas I have been entirely unable to obtain a conveyer action using a "Nichrome" trough of much greater rigidity operating at vibrations of 3600 per minute even when using additional supporting members.

In carrying my invention into practice, I prefer to employ one or more two element rectifiers acting in conjunction with a switch in the load circuit to select the desired current impulses to operate the conveyer, destructive arcing being avoided by having the switch make and break contact during zero current intervals. Consequently, from an alternating current source of sixty cycles, I may obtain twenty four hundred, eighteen hundred, fourteen hundred forty, or twelve hundred or less spaced current impulses per minute, and from a fifty cycle alternating current source I may obtain 2000, 1500, 1200 or 1000 or less spaced current impulses per minute. I prefer to employ a vibration frequency of 1800 per minute to operate the conveyer trough, as this involves the most simple mechanism for operation from a sixty cycle source and such conveyers have practically all of the advantages obtained in conveyers operating at higher frequencies and substantially none of their disadvantages.

The conveyer trough may be mounted in any suitable manner to provide for unobstructed vibration thereof, and I prefer to employ cantilever springs for supporting the trough to provide a natural or free period of vibration thereof greater than the period between the commencement of actuating current impulses. This enables the conveyer to receive periodic actuating impulses which set the conveyer vibrating at a forced frequency and damp the vibrations to prevent resonant operation and its accompanying sensitivity.

Figure 3:
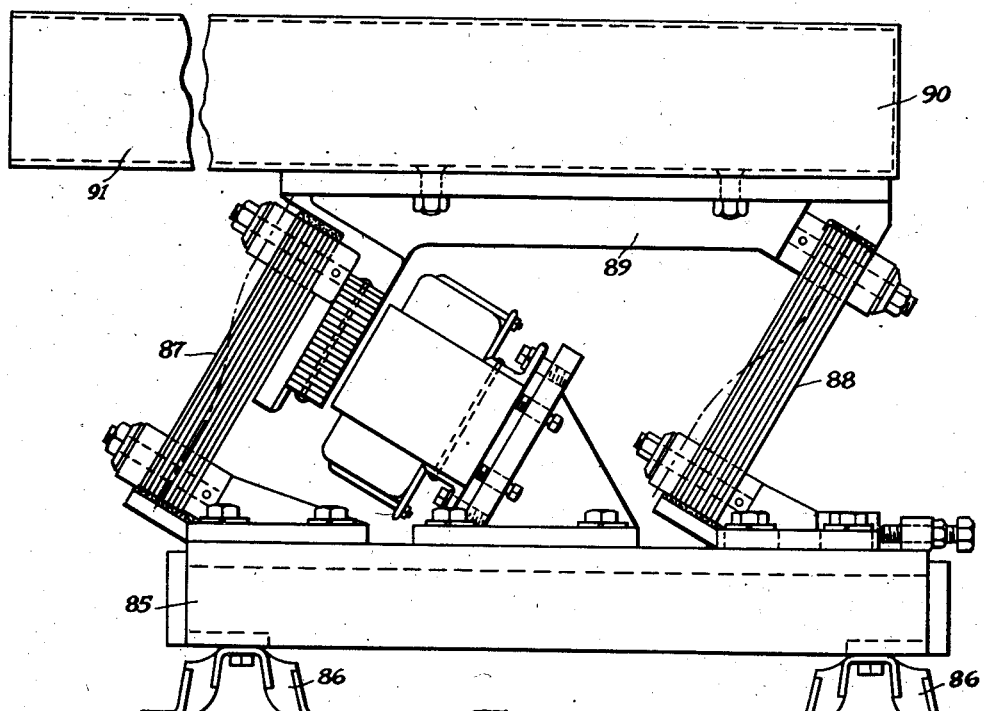
Figure 2:
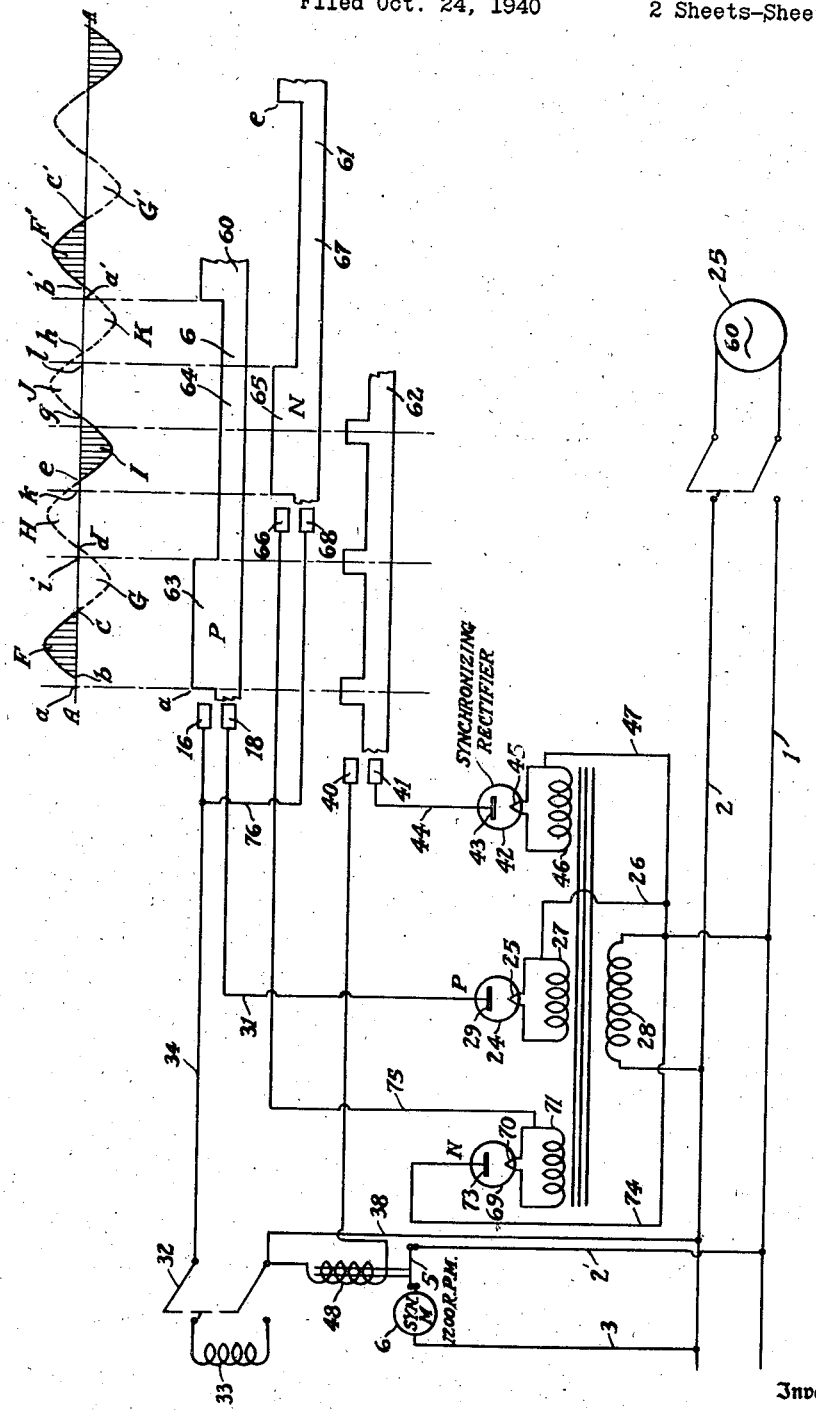

The invention will be described in greater detail in connection with the accompanying drawings, wherein I have shown a preferred embodiment of my invention by way of example, and wherein, Figure 1 is a wiring diagram for operating a vibratory conveyer from a current having 1800 impulses per minute, and Figure 2 is a wiring diagram for operating a vibratory conveyer from a current having 2400 impulses per minute, and Figure 3 shows a preferred construction and conveyer mounting.

Referring to Figure 1 of the drawings, there is shown an alternating current wave about axis A—A consisting of alternate positive and negative impulses B, C, D, E, B', C', D', etc. intersecting the zero axis at points $b, c, d, e, b', c', d', e'$, etc. The broken portion of the current wave represents the current impulses not utilized in this modification.

The main line conductors 1, 2, which supply sixty cycle current from any suitable source is conducted by leads, 3, 4 and switch 5 to a synchronous motor 6 rotating at 1800 revolutions per minute, and driving the commutator ring 7 and synchronizing ring 8 shown in projection. The synchronizing ring 8 has a continuous section 9 extending 360°, and two contacting segments 11 and 12, which are 180° apart, center to center. The motor with its synchronizing ring and collector ring, is timed to make one revolution between the points $a, a'$, that is, one revolution for two alternations of the supply current, and the current impulses above the zero axis A—A may be arbitrarily regarded as the positive impulses, and those below this axis regarded as negative. The commutator ring 7 has a section 15 which is 360° in arcuate extent and a brush 16 makes continuous contact therewith. The other section 17 of the commutator ring is 180° in extent and is intermittently contacted by the brush 18.

A rectifier 24 is provided, and as shown comprises a two element thermionic rectifier having a filament 25 supplied with heating current by transformer windings 27 and 28, and is connected to main 1 by lead wire 26. The plate 29 is connected by lead 31 through switch 32 to the coil 33 of the conveyer motor and by a lead 34 to brush 18. When the collector ring 7 is making contact with both brushes 18 and 16, the lead 36, variable resistance 37 and lead 38 provide a return to main conductor 2.

Assuming switch 5 closed so that motor 6 is rotating at 1800 revolutions per minute and that the brushes 16 and 18 are in line with the projection of point $a$, when the segment 17 reaches point $a$, brushes 16 and 18 will be connected by conductor sections 15 and 17. When the point $b$ is reached the tube 25 becomes conducting and the positive current impulse B from $b$ to $c$ is passed through the tube and through conveyer motor 33 to actuate the same. When the point $c$ is reached, brushes 16 and 18 are still connected, but as the tube 25 ceases to pass current at this point, the impulse C is not transmitted to the conveyer motor. However, as the conveyer motor circuit has inductance, the actuating current impulse does not actually reach zero at $c$ but at some point between $c$ and $d$, and accordingly brushes 16 and 18 are disconnected at some intermediate point $f$ at which substantially no current is flowing in the conveyer motor circuit. The breaking of the connection between brushes 16 and 18 accordingly occurs during zero current and there is no sparking.

At the point $d$ tube 24 again becomes conducting, but as the brushes 16 and 18 are not in contact the conveyer motor circuit is open and no current can flow through the tube to the conveyer motor 33. This open condition of the circuit continues to the point $e$, at which point the tube 24 becomes non-conducting, and to the point $a'$ where segment 17 again connects brushes 16 and 18 to close the conveyer motor circuit ready for the next current impulse, which starts at $b'$, the cycle just described being repeated. It will be noted that at the rectifier the actuating current impulse B lasts for 180 electrical degrees and that the zero interval between the end of impulse B and commencement of the next actuating impulse B' is about 540 electrical degrees. The zero space between actuating current impulses, therefore, is greater than 180 electrical degrees, and is greater than the duration of current impulse B.

I also provide an arrangement to maintain motor 6 operating in proper synchronism with the actuating current impulses. For this purpose brush 40 is provided to continuously contact section 9 of the synchronizing ring and brush 41 intermittently contacts the segments 11 and 12. A second rectifier 42 is provided which need not be as large as tube 25 as it carries only a small current, and its plate 43 is connected to brush 41 by lead 44. The filament 45 is heated by transformer coils 46 and 28 and is connected by conductor 47 to the filament of tube 24, so that tubes 42 and 24 become conducting for the same current impulse. When brushes 40 and 41 are connected by the segments 9 and 11 or 9 and 12 the current impulse B passes therethrough and through solenoid 48 and by lead 38 to the main 2. When this occurs, switch 5 is opened by the solenoid 48 for an instant, thus opening the circuit of motor 6 for a short interval. The collector or synchronizing ring 8 and its brushes 40, 41 are so positioned that at the point b, where current impulse B starts, the segment 11 opens the connection between brushes 40, 41, and if the motor 6 is properly synchronized, current impulse B does not pass through solenoid 48, and switch 5 remains closed. Just prior to the point d, segment 12 again connects brushes 40 and 41 but disconnects them before reaching point d if the motor 6 is properly synchronized. However, assuming motor 6 is not properly synchronized with the impulse B at the start when the line switch is closed, the segment 11 will connect brushes 40 and 41 at the point b or somewhere between points b and c, thus causing a current to pass through solenoid 48 to open switch 5 for a short interval, which allows the motor 6 to slow down. When the current impulse B reaches zero or segment 11 breaks contact between brushes 40 and 41 (whichever happens first) switch 5 is closed by its spring and motor 6 is again actuated, but the slowing down of the motor causes it to skip a pole, this action being repeated until the motor thus is brought into synchronism with the proper current impulse. Segment 12, of course, may act similarly to segment 11, allowing impulse D to flow through the rectifier 42 and solenoid 48 when the motor is not properly synchronized. When the motor 6 is operating at proper speed and is properly synchronized, switch 32 may be closed to actuate the conveyer motor.

In the modification shown in Figure 2, wherein corresponding parts are indicated by like reference characters, the alternating current plotted about axis A—A consists of alternate positive and negative impulses F, G, H, I, J, K, F', G', etc. intersecting the zero axis at points b, c, d, e, g, h, b', c' etc.

The synchronous motor 6 rotating at 1200 revolutions per minute, drives the commutator rings 60 and 61 and synchronizing ring 62 shown in projection. The motor 6 and collector rings is timed to make one revolution between the points b, b', or one revolution for three alternations of the supply current. The positive commutator ring 60 has one section 63 which is 120° in arcuate extent and the brush 16 makes contact therewith at proper intervals. The other section 64 of the commutator ring is 360° in extent and is constantly contacted by the brush 18. The negative commutator ring 61 has a section 65 which is 120° in extent and is arcuately displaced about 540 electrical degrees with respect to section 63 or 180° with respect to point a of the positive ring, and has a brush 66 to make contact therewith. The other section 67 makes continuous contact with the brush 68.

Two rectifiers 24 and 69 are provided having filaments 25 and 70 supplied with heating current by transformer windings 27, 71 and 28. The plate 29 of tube 24 is connected by lead 31 to brush 18 and a lead 34 from brush 16 connects through switch 32 with coil 33 of the conveyer motor, lead 38 providing a return to main 2. The plate 73 of tube 69 is connected by lead 74 with lead 26 of tube 24, thence to main 1. Filament 70 is connected by lead 75 to brush 66 of the negative commutator 61, and brush 68 is connected by leads 76 and 34 to brush 16.

From the description so far pursued, it will be apparent that when the motor 6 is properly synchronized to rotate at 1200 revolutions per minute, the brushes 16 and 18 will be connected at a by section 64 and 63 of the positive commutator and when the point b is reached the first current impulse F will be transmitted to the conveyer motor 33, returning by lead 38 to the main 2. When this impulse reaches zero at c, the tube 24 becomes non-conducting, and impulse G will not be transmitted, even though brushes 16 and 18 are connected. When the brushes 16 and 18 reach the point i, which occurs shortly after tube 24 becomes non-conducting, the connection therebetween is broken and brush 18 continues in contact with the continuous portion 64 of the positive commutator, and when the point d is reached, brushes 16 and 18 are not connected, so that current impulse H cannot flow through tube 24. When the point k is reached, brushes 66 and 68 are connected by segments 65 and 67 but no current can flow therebetween because tube 69 is non-conducting. When the point e is reached tube 69 becomes conducting and the current impulse I will pass through lead 38, through motor coil 33 and by leads 34 and 76 to brush 68, across conductor sections 65 and 67 to brush 66 and by lead 75 to filament 70, through the tube 69 to plate 73 and by lead 74 to the main 1. When the point g is reached, tube 69 is non-conducting, so that impulse J is not transmitted, and when the point l is reached the connection between the brushes 66 and 68 is broken. As neither brushes 16, 18 or 66, 68 are now connected, impulse K will not be transmitted. Contact of brushes 16, 18 occurs at point a', while tube 24 is non-conducting and when the point b1 is reached the positive impulse F' is conducted by brushes 16, 18 to the conveyor motor, as previously described. It will thus be seen that this arrangement selects current impulses separated by more than 180 electrical degrees at the rectifier for actuating the conveyer motor to produce 2400 impulses per minute from a sixty cycle source.

The synchronizing ring 62 and rectifier 42 are provided to insure proper rotation of commutators 60 and 61 and is arranged to provide contact between the brushes 40 and 41 at the points b, d or g if the motor 6 is not in proper synchronism with the current impulses, as previously described. Filament 45 is shown connected to filament 25 of tube 24, but it may be connected to filament 70 of tube 69, in which case the synchronizing ring 62 should be displaced 180 electrical degrees.

In Figure 3 I have shown a preferred form of vibratory conveyer operated in accordance with the present invention. The motor and conveyer trough mounting are described and claimed in my patent No. 2,187,717, issued January 23, 1940, and need not be described here in detail. The base 85 is mounted on suitable vibration absorbers 86 and carries front and rear cantilever leaf spring assemblies 87 and 88 secured at one of their ends to the base 85 in any suitable manner and having a carrier 89 secured to the other ends of the springs. Spring assemblies 87 and 88 may be adjustable or may be of predetermined vibration periodicity, if desired. A trough 90 is bolted, welded or otherwise secured to the carrier 89, and as shown, has a long overhang 91 at the front end. If desired, the rear spring assembly 88 may be omitted or replaced by any other type of support for the rear end, the front spring being strengthened accordingly to the desired periodicity. Or, any other type of resilient support for the conveyer trough may be supplied, as for example, one or more springs carrying the trough at the middle and supported at its ends, coil springs, or combinations of different types of springs.

Having described my invention, what I claim as my invention and desire to secure by United States Letters Patent is:

1. An apparatus comprising an armature, resilient means secured to said armature resisting displacement thereof, an electromagnet adjacent the armature, a source of alternating current of predetermined frequency, a rectifier connected between said source and said electromagnet in its load circuit to pass spaced current pulsations thereto, and synchronously operated switch means in the load circuit between the rectifier and electromagnet to interrupt said circuit during zero current intervals, said interruptions occurring at intervals to pass current impulses at least 540 electrical degrees apart.

2. An apparatus comprising an armature, resilient means secured to said armature resisting displacement thereof, a conveyer trough secured to said armature to vibrate therewith, an electromagnet adjacent the armature, a source of alternating current, a rectifier connected between said source and electromagnet to pass spaced unidirectional current impulses, and synchronously operated switch means in the load circuit of the rectifier between the rectifier and electromagnet to interrupt said circuit during zero current intervals, said interruptions occurring at intervals to pass current impulses at least 540 electrical degrees apart.

CARL S. WEYANDT.